United States Patent [19]

Sanders et al.

[11] Patent Number: 4,623,529

[45] Date of Patent: Nov. 18, 1986

[54] METHOD OF MAKING A ZEOLITE OF THE CLINOPTILOLITE TYPE BY SEEDING

[75] Inventors: Robert N. Sanders, Baton Rouge; Sebastian M. Laurent, Greenwell Springs, both of La.

[73] Assignee: Ethyl Corporation, Richmond, Va.

[21] Appl. No.: 776,752

[22] Filed: Sep. 16, 1985

[51] Int. Cl.$^4$ .............................................. C01B 33/28
[52] U.S. Cl. ..................................... 423/328; 423/329
[58] Field of Search .................... 423/328, 328 C, 329

[56] References Cited

U.S. PATENT DOCUMENTS 3,321,272  5/1967  Kerr ..................................... 423/329
3,375,064  3/1968  Miale et al. .......................... 423/328
4,166,099  8/1979  McDaniel et al. ................... 423/329

Primary Examiner—John Doll
Assistant Examiner—Lance Johnson
Attorney, Agent, or Firm—Donald L. Johnson; John F. Sieberth; Paul H. Leonard

[57] ABSTRACT

The present invention is directed to the preparation of a synthetic crystalline zeolite of the clinoptilolite type wherein a solid amorphous silica, an alumina source, sodium hydroxide, a seed clinoptilolite and water are mixed together, heated, refluxed, then filtered and a synthetic crystalline zeolite of the clinoptilolite type obtained.

14 Claims, No Drawings

METHOD OF MAKING A ZEOLITE OF THE CLINOPTILOLITE TYPE BY SEEDING

BACKGROUND OF THE INVENTION

1. Field of the Invention

In general, the present invention relates to the production of a synthetic natural zeolite, namely clinoptilolite, and in particular a sodium clinoptilolite.

2. Description of the Prior Art

Certain naturally occurring hydrated metal aluminum silicates are called zeolites. The synthetic zeolites of the invention have compositions similar to those of the natural zeolite, clinoptilolite. Clinoptilolite is useful in feeding animals, as a hydrocarbon conversion catalyst and for water purification.

Zeolites consist basically of a three-dimensional frame work of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

The composition of all zeolites may be represented by the general formula as follows:

$$(M_2^+, M^{2+})O.Al_2O_3.xSiO_2.yH_2O$$

$M^+$ is usually Na or K, and $M^{2+}$ is Mg, Ca or Fe and more rarely another of the group I or group II elements. In general, a particular crystalline zeolite will have values for "x" and "y" that fall in a definite range. The value "x" for a particular zeolite will vary somewhat since the aluminum atoms and the silicon atoms occupy essentially equivalent positions in the lattice. It is generally equal to or greater than 2. Minor variations in the relative number of these atoms do not significantly alter the crystal structure or physical properties of the zeolite. The value of "y" is not necessarily an invariant for all samples of zeolites. This is true because various exchangeable ions are of different size, and since there is no major change in the crystal lattice dimensions upon ion exchange, the space available in the pores of the zeolites to accommodate water molecules varies.

The formula for sodium clinoptilolite may be written as follows:

$$0.9\pm0.2Na_2O.Al_2O_3.(5.2-10.2)\pm0.1SiO_2.yH_2O$$

wherein "y" may be any value up to 7.

The pores of zeolites normally contain water.

The above formulas represent the chemical analysis of clinoptilolite. When other materials as well as water are in the pores, chemical analysis will show a lower value of "y" and the presence of other absorbates. The presence in the crystal lattice of materials volatile at temperatures below about 600° C. does not significantly alter the usefulness of the zeolites as an absorbent since the pores are usually freed of such volatile materials during activation.

Among the ways of identifying zeolites and distinguishing them from other zeolites and other crystalline substances, the X-ray powder diffraction pattern has been found to be a useful tool. In obtaining X-ray powder diffraction patterns, standard techniques are employed. The radiation is the doublet of copper, and a Geiger counter spectrometer with a strip chart pen recorder is used. The peak heights, I, and the positions as a function of $2\theta$ where $\theta$ is the Bragg angle, are read from the spectrometer chart. From these, the relative intensities, $100I/I_o$, where $I_o$ is the intensity of the strongest line or peak, and "d" the inter planar spacing in Å corresponding to the recorded lines are calculated. A clinoptilolite type zeolite has a characteristic X-ray powder diffraction pattern which may be employed to identify it. The X-ray powder diffraction data are shown in Table A. The values for the interplanar space "d" are expressed in angstrom units.

TABLE A

X-RAY DIFFRACTION PATTERN
FOR SYNTHETIC ZEOLITE OF CLINOPTILOLITE TYPE

| hkl | d(Å) | Relative Intensity |
|-----|------|--------------------|
| 020 | 8.92 | 100 |
| 002 | 7.97 | 3 |
| 101 | 6.78 | 2 |
| 031 | 5.61 | 2 |
| 112 | 5.15 | 7 |
| 130 | 4.65 | 14 |
| 103 | 4.35 | 2 |
| 132 | 3.964 | 55 |
| 004 | 3.964 | 55 |
| 042 | 3.897 | 57 |
| 141 | 3.74 | 7 |
| 211 | 3.55 | 6 |
| 051 | 3.48 | 3 |
| 220 | 2.419 | 16 |
| 202 | 2.324 | 4 |
| 222 | 3.168 | 14 |
| 222 | 3.119 | 15 |
| 231 | 3.07 | 8 |
| 044 | 2.974 | 80 |
| 035 | 2.793 | 15 |
| 125 | 2.793 | 15 |
| 161 | 2.728 | 33 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently, these additional materials can be identified as initial reactants in the synthesis of the zeolite, or as other crystalline substances. When the zeolite is heat treated at temperatures of between 100° C. and 600° C. in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials, which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist", Volume 28, Page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3}-0.67$, or greater produce a gel when treated with hydrochloric acid. Zeolites having small aluminum to silicon ratios disintegrate in the presence of hydrochloric acid and precipitate silica. These tests were developed with natural zeolites and may vary slightly when applied to synthetic types.

Clinoptilolite may be useful as a second zeolite component in fluid catalytic cracking (FCC) catalysts. It would satisfy a need for high octane conversion of the light gasoline fractions, a need that ZSM-5 serves in some very crucial cases, but for which ZSM-5 has serious shortcomings. Clinoptilolite also holds promise in ammonia removal from waste water, reduction of ammonia toxicity in animal nutrition, and as a slow release ammonia component in soil nutrition fertilizers.

Clinoptilolites found in nature are impure and contain structural imperfections that make reliable property characteristics unobtainable. A uniform, high quality synthetic clinoptilolite would have considerable promise for a number of commercial applications.

It is a primary object of the present invention to provide a simple, economical process for making a synthetic crystalline zeolite of the clinoptilolite type.

Other objects and advantages of the invention will be more readily apparent from a reading of the description hereinafter.

SUMMARY OF THE INVENTION

The present invention is directed to the preparation of synthetic crystalline zeolite of the clinoptilolite type wherein an amorphous solid silica is mixed with sodium aluminate powder or other alumina source, a seed amount of clinoptilolite powder, and sodium hydroxide. The paste formed is stirred until homogenous, sealed in an autoclave and heated at about 135° C. to 140° C. for 75 to 100 hours. A synthetic crystalline zeolite of the clinoptilolite type is then recovered.

DESCRIPTION OF THE PREFERRED EMBODIMENTS

Clinoptilolite is a name given to synthetic zeolites having the crystal structure of a naturally occurring mineral which is a hydrous silicate of aluminum, calcium, sodium, and potassium, $(Ca,Na_2, K_2)O \cdot Al_2O_3 \cdot 10SiO_2 \cdot 7H_2O$. It has a silicon to aluminum ratio of 2.7 to 5.3.

In making synthetic zeolite of the clinoplilolite type, a relatively small quantity of synthetic clinoptilolite from a previously prepared bulk product is ground to a very fine powder and used as a seed.

In general, a solution of sodium hydroxide and water is prepared. An amorphous solid silica such as J. M. Huber Co.'s Zeofree 80 is mixed with an alumina source and the clinoptilolite seed, the sodium hydroxide solution is added forming a paste. The paste is stirred until homogenous. Afterwards, the paste is sealed in an autoclave and heated at 135° C.–140° C. for 75-100 hours. The synthetic zeolite of the clinoptilolite type is then recovered. Sodium aluminate or alumina trihydrate (ATH) are preferred alumina sources.

Synthetic zeolite of the clinoptilolite type or natural clinoptilolite may be used as the seed in amounts of about one percent to 20 percent by weight of the mixture. The amount of seed zeolite used is not critical other than it should be a sufficient amount to provide the necessary activation. Larger amounts may be used since the zeolite is in the final product, but obviously, not sufficient to undesirably dilute the product.

The reaction system has the following formula:

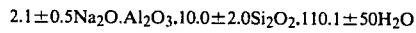

$$2.1 \pm 0.5 Na_2O \cdot Al_2O_3 \cdot 10.0 \pm 2.0 Si_2O_2 \cdot 110.1 \pm 50 H_2O$$

A preferred reaction system has the following formula:

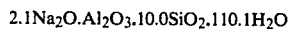

$$2.1 Na_2O \cdot Al_2O_3 \cdot 10.0 SiO_2 \cdot 110.1 H_2O$$

$K_2O$ may be substituted for all or part of the $Na_2O$ but may require different temperatures and reaction times. Cook temperature may range from 100° C. to 200° C. and the cook time may vary from 12 hours to 160 hours.

The alumina value is preferably sodium aluminate, but may be any reasonable alumina source, including alumina trihydrate.

The silica source is preferably a Zeofree 80 type amorphous silica, but may be any small particle size solid amorphous silica.

Caustic solutions may be used and mixtures of sodium hydroxide and potassium hydroxide or potassium hydroxide with potassium aluminate are suitable.

Reaction temperatures may be as low as 100° C. and as high as 200° C. The preferred temperature range is from 120° C. to 175° C.. The most preferred temperature range is from 130° C. to 145° C.

The cook period or heating time may be from 1 hour to 240 hours. The preferred cook period is about 40 hours to 120 hours. The most preferred cook period is about 72 hours to 100 hours.

Any convenient recovery system is suitable.

The invention is further illustrated by the following examples which set forth various methods and compositions.

Equipment

The reaction vessel was a Nalgene 4 oz. wide mouth plastic bottle in a temperature regulated oil bath. Products were filtered in a pressure filtration apparatus using Whatman No. 41 filter paper.

Reagents

| | |
|---|---|
| Sodium aluminate (SA) | Commercial grade |
| Alumina trihydrate (ATH) | Commercial grade |
| Sodium Hydroxide | Commercial beads |
| Amorphous Silica - Zeofree 80 Amorphous Silica - J. M. Huber Co. | 96% $SiO_2$, 4% $Na_2SO_4$ (washed free of $Na_2SO_4$ to use) |

(Any similar solid amorphous silica is suitable)

Seed Preparation

Seed sample was a commercially produced natural clinoptilolite, Anaconda 1010B. Crystallinity of this product was the standard by which crystallinity of the product was compared. Seed amount is preferably about 1.0 percent to 20.0 percent. The seed may also be a previously preferred synthetic clinoptilolite.

Following the procedures described hereinabove, the following Examples are illustrative of the instant invention.

EXAMPLE I

Following the general procedure, 13.7 grams of a commercial natural clinoptilolite was ground along with 8.2 grams of sodium aluminate until a fine powder was achieved. Then, 4.6 grams of sodium hydroxide plus 33.8 grams of amorphous silica plus 96.6 grams of water were mixed together for about one hour. The two mixtures were then mixed together in a Teflon lined autoclave and heated at 140° C. for 72 hours. The product was recovered by filtration and had a crystallinity of 59 percent of standard.

EXAMPLE II

Continuing the procedure, 20.8 grams of Zeofree 80 (containing 20.0 grams of $SiO_2$) were mixed with 5.5 grams of sodium aluminate, which had been previously ground to a fine powder and 2.6 grams of powdered clinoptilolite (seed). Afterwards, 2.9 grams of sodium hydroxide dissloved in 65.3 grams of water were added and stirred into the solid mixture until thoroughly mixed. The pasty mixture was placed in an autoclave, sealed and heated at 135° C.–140° C. for 79 hours. The product was recovered via filtration. XRD showed a crystallinity of 67 percent. Small amounts of unclassified impurities were noted. The results are shown in Table I.

EXAMPLE III

Using a cook period of 79 hours and a reaction temperature of 135° C.–140° C., a number of experiments were run as follows:

| Run No. | Order of mixing, etc. |
|---|---|
| 1 | silica + ATH + seed were mixed together; KOH in $H_2O$, then added. |
| 2 | $NaAlO_2$ (SA) + seed ground together; silica + NaOH + $H_2O$ refluxed to solution, added to seed SA. |
| 3 | NaOH + silica + $H_2O$ refluxed to solution; seed + $Al_2(SO_4)_3$ (AS) mixed, then added. |
| 4 | NaOH + silica + $H_2O$ refluxed to solution; seed + ATH mixed then added. |
| 5 | Same as Run 4, but $Al(OH)_3$ (AH) used in lieu of ATH. |
| 6 | Silica + NAO plus seed mixed, NaOH dissolved in $H_2O$ and added. |
| 7 | Same as Run 6. |
| 8 | Same as Run 6. |
| 9 | Same as Run 6. |

From the foregoing, it is readily seen that an excellent product is obtained following the procedure herein.

The foregoing disclosure and description of the invention is illustrative and explanatory thereof and various changes in the illustrated process may be within the scope of the appended claims without departing from the spirit of the invention.

What is claimed:

1. A method of producing a synthetic crystalline zeolite of the clinoptilolite type as indicated by diffraction data as set forth in table "A", comprising mixing a finely ground solid amorphous silica and an alumina source, caustic and a seed amount of clinoptilolite to provide a reaction mixture of $(2.1\pm0.5)Na_2OAl_2O_3$ $(10.0\pm2.0)SiO_2$ $(110.1\pm50.0)H_2O$, heating the mixture to a temperature of about 100° C.–200° C. for up to about 240 hours, thereby forming a synthetic crystalline zeolite of said clinoptilolite type, and recovering said synthetic crystalline zeolite of said clinoptilolite type.

2. The method of claim 1, wherein the seed clinoptilolite is added in an amount of about 1% to 20% by weight of the mixture.

3. The method of claim 1, wherein the seed clinoptilolite is obtained from a previously prepared bulk synthetic zeolite of said clinoptilolite type.

4. The method of claim 1, wherein the heating period is about 12 hour to 160 hours.

5. The method of claim 1, wherein the mixture is heated to about 135° C.–140° C. for a period of about 72–100 hours.

6. The method of claim 1, wherein the seed clinoptilolite is a natural clinoptilolite.

7. The method of claim 1, wherein the reaction system is as follows:

$2.1Na_2O.Al_2O_3.10.0SiO_2.110.1H_2O$.

8. The method of claim 1, wherein the reaction system is as follows:

$2.1Na_2O.Al_2O_3.10.7SiO_2.109H_2O$.

9. The method of claim 1, wherein the alumina source is alumina trihydrate.

10. The method of claim 1, wherein the alumina source is sodium aluminate.

11. The method of claim 1, wherein the mixture is heated to about 120° C. to 175° C.

12. The method of claim 1, wherein the mixture is heated to about 130° C. to 145° C.

13. The method of claim 1, wherein the heating period is about 40 hours to 120 hours.

14. The method of claim 1, wherein the heating period is about 72 hours to 100 hours.

TABLE I

| Run No. | Amorphous Silica (Grams) | Sodium Hydroxide (Grams) | Alumina Source | Alumina (Grams) | Water (Grams) | Seed (Grams) | Product (Percent) |
|---|---|---|---|---|---|---|---|
| 1 | 10.4 | 3.8 | ATH | 2.7 | 31.7 | 2.7 | 36 |
| 2 | 33.8 | 4.6 | SA | 8.2 | 96.6 | 13.7 | 59 |
| 3 | 33.8 | 8.6 | AS | 17.4 | 96.6 | 13.7 | None |
| 4 | 33.8 | 8.6 | ATH | 8.6 | 93.0 | 13.7 | 32 |
| 5 | 33.8 | 8.6 | AH | 8.6 | 93.0 | 13.7 | 63 |
| 6 | 20.8 | 2.9 | SA | 5.5 | 65.3 | 2.6 | 65 |
| 7* | 20.8 | 2.9 | SA | 5.5 | 65.3 | 2.6 | 29 |
| 8 | 20.8 | 2.9 | SA | 5.5 | 65.3 | 1.3 | 35 |
| 9** | 20.8 | 2.9 | SA | 5.5 | 65.3 | 2.6 | 102 |

ATH - Alumina trihydrate
SA - $NaAlO_2$
AS - $Al_2(SO_4)_3$
AH - $Al(OH)_3$
*cooked 120 hours
**cooked 48 hours